United States Patent
Jarrett (10) Patent No.: US 9,385,921 B1
(45) Date of Patent: Jul. 5, 2016

(54) PROVISIONING NETWORK SERVICES

(75) Inventor: Ian Anthony Leslie Jarrett, Hampshire (GB)

(73) Assignee: Juniper Networks, Inc., Sunnyvale, CA (US)

( * ) Notice: Subject to any disclaimer, the term of this patent is extended or adjusted under 35 U.S.C. 154(b) by 1308 days.

(21) Appl. No.: 10/791,743

(22) Filed: Mar. 4, 2004

(51) Int. Cl.
*G06F 15/16* (2006.01)
*H04L 12/24* (2006.01)

(52) U.S. Cl.
CPC ............ *H04L 41/12* (2013.01); *H04L 41/04* (2013.01); *H04L 41/085* (2013.01); *H04L 41/14* (2013.01)

(58) Field of Classification Search
CPC ....... H04L 41/08; H04L 41/04; H04L 41/085; H04L 41/12; H04L 41/14
USPC ......................................................... 709/226
See application file for complete search history.

(56) References Cited

U.S. PATENT DOCUMENTS

| | | | |
|---|---|---|---|
| 5,513,171 A * | 4/1996 | Ludwiczak et al. | 370/254 |
| 7,099,580 B1 * | 8/2006 | Bulbul | 398/9 |
| 7,418,513 B2 * | 8/2008 | Chang et al. | 709/230 |
| 2003/0084161 A1 * | 5/2003 | Watson et al. | 709/227 |
| 2004/0010544 A1 * | 1/2004 | Slater et al. | 709/203 |
| 2004/0024795 A1 * | 2/2004 | Hind et al. | 707/204 |
| 2004/0120318 A1 * | 6/2004 | Clemm et al. | 370/395.2 |
| 2004/0230681 A1 * | 11/2004 | Strassner et al. | 709/226 |
| 2005/0065994 A1 * | 3/2005 | Creamer et al. | 709/202 |
| 2006/0294238 A1 * | 12/2006 | Naik et al. | 709/226 |

OTHER PUBLICATIONS

Juniper Networks—Field Guide and Reference. Garrett et al. Oct. 11, 2002. Addison Wesley Professional.*
S. Barkai et al.: "Service Centric Management," Internet Engineering Task Force Draft Memo; Dec. 30, 2002; pp. 1-11.

* cited by examiner

*Primary Examiner* — William Goodchild
(74) *Attorney, Agent, or Firm* — Harrity & Harrity, LLP (57) ABSTRACT

A network service database stores abstractions of services provided by network elements. The network elements may proactively initiate communication with the service database. Additionally, network elements may update the service database when the network element experiences a state change. Client applications may contact the service database to perform functions, such as provisioning network services, billing, and fault monitoring without having to be concerned with the underlying details of each of the network elements.

21 Claims, 5 Drawing Sheets

| Network Element | FE | GE | ATM | SON-ET | FR | IPv4 | IPv6 | DOC-SIS | BRAS | L2 VPN | L3 VPN | IPSec | BGP | OSPF |
|---|---|---|---|---|---|---|---|---|---|---|---|---|---|---|
| A | 0 | 0 | 1 | 1 | 0 | 1 | 1 | 0 | 1 | 1 | 1 | 0 | 1 | 1 |
| B | 1 | 0 | 0 | 0 | 1 | 1 | 0 | 1 | 0 | 0 | 0 | 0 | 0 | 1 |
| C | 0 | 1 | 1 | 1 | 1 | 1 | 1 | 0 | 1 | 1 | 1 | 1 | 1 | 1 |

PROVISIONING NETWORK SERVICES

BACKGROUND OF THE INVENTION

A. Field of the Invention

This invention relates generally to communication networks, and more particularly, to the managing/provisioning of network services.

B. Description of Related Art

Communication networks, such as Internet Protocol (IP) based networks, are often large networks maintained by network service providers. Typically, service providers sell services and bandwidth on their network to interested parties (e.g., end-users, corporations, etc.).

A typical IP network includes a number of network elements, such as routers, that act together to form the complete network. A router is a device that determines the next network element to which data units (e.g., packets) should be forwarded during their trip through the network. Conventional routers often support a number of network features beyond basic routing of data units. For example, a network may support value-added technologies and protocols such as Multi-Protocol Label Switching (MPLS), Traffic Engineering, Class of Service Differentiation, Virtual Private Networks (VPNs), and IP version 6. A VPN, for example, is a mechanism through which a service provider may provide an encrypted link between multiple endpoints, such that a customer using the VPN is assured of a private connection, even though the path of the VPN through the network may extend through non-secure portions of the network.

Network provisioning may include the process of initially configuring the network to support a customer or a value-added service or technology for the customer. Network provisioning can be a complicated and difficult task. To help manage complex networks, service providers use network management software that may query the various network elements to discover their configurations and direct the network elements to reconfigure themselves for the various network provisioning tasks.

Existing network management software/techniques, however, can be relatively complicated and problematic. For example, because of interoperability problems associated with a heterogeneous network made up of different types or vendors of network elements, the network management software may have difficulty consistently discovering the current state or capabilities of all the network elements. Additionally, actually communicating and configuring each network element may require individually logging on to the network elements through, for example, a basic command line interface, and providing commands from a set of commands designed to work with that network element.

Accordingly, there is a need in the art for a system that will allow service providers or others to more easily and reliably provision network services.

SUMMARY OF THE INVENTION

A first aspect consistent with the principles of the invention is directed to a network element that provides network services in a network. The network element includes a service broker configured to construct a model of services offered by the network element and to proactively transmit the model to a network database that maintains service information relating to a plurality of network elements in the network. The network element further includes an interface to the network.

Another aspect of the invention is directed to a network device that includes a database and an interface. The database stores services offered by elements in the network and the interface receives information defining the services offered by the elements. The information is pushed from the elements to the interface without a request for the information from the network device.

Yet another aspect of the invention is directed to a method for managing a network. The method includes issuing a network service request to a services database, where the request defines an abstraction of at least one service that is to be provisioned in the network. The method further includes receiving an acknowledgement of the completion or failure of the request.

Yet another aspect of the invention is directed to a network that includes a database configured to store services offered by network elements in the network. The network additionally includes a number of service brokers installed on respective ones of the network elements. The service brokers being configured to construct a model of services offered by the network elements and proactively transmit the model to the database.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, network elements are represented as abstractions defined by the services they provide rather than as a collection of routers, links, and protocols. A database may be used to store the abstraction of the network elements. Each network element may proactively transmit changes in its state to the database. Clients contact the database to perform functions, such as provisioning network services, billing, and fault monitoring without having to be concerned with the underlying details of each of the network elements.

Network Overview

Figure 1:
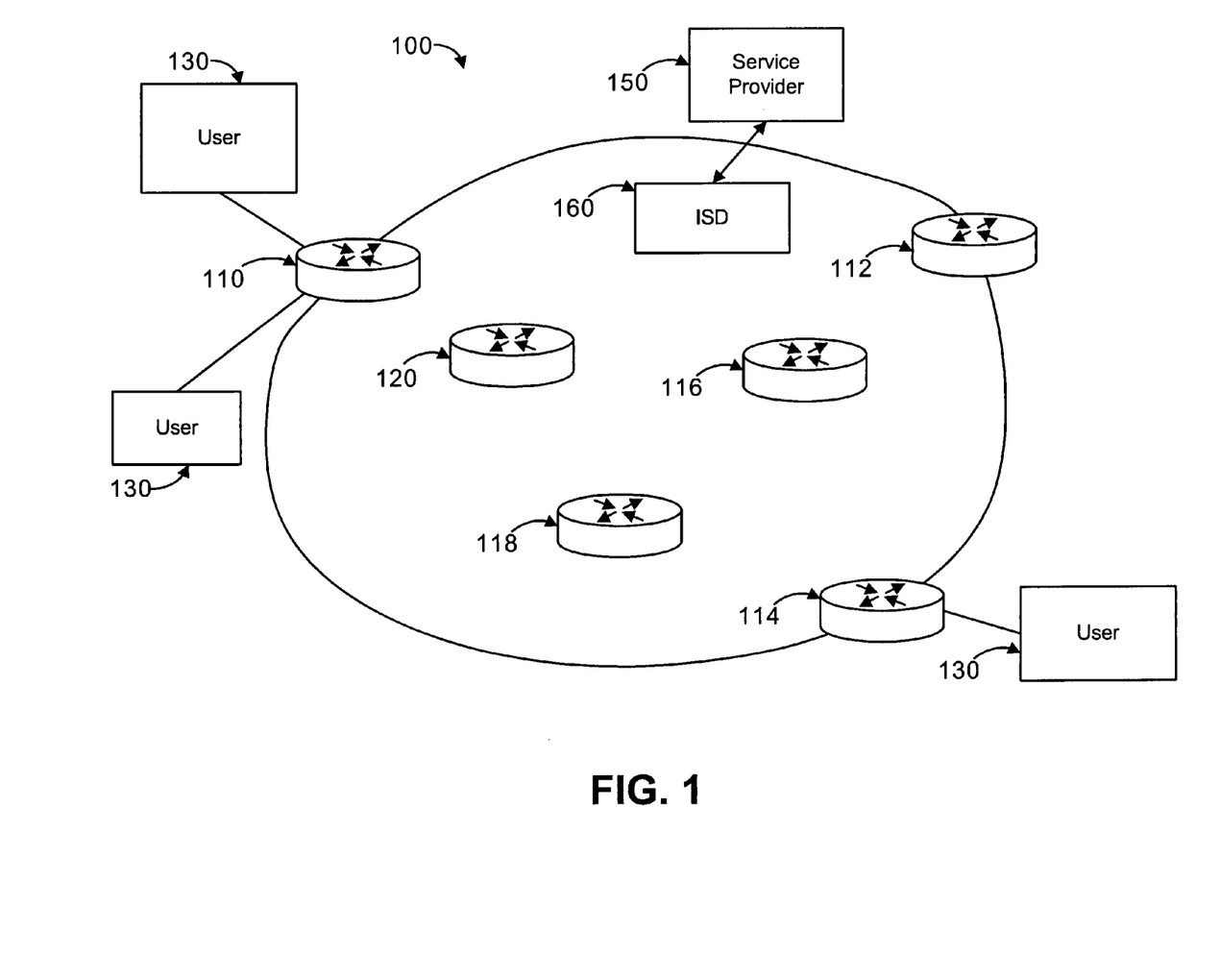
FIG. 1 is a diagram of an exemplary network in which concepts consistent with the invention may be implemented.

FIG. 1 is a diagram of an exemplary network 100 in which concepts consistent with the invention may be implemented. Network 100 may be an IP network that includes a number of routers and/or switches 110-120. As shown, network 100 includes edge routers 110, 112, and 114, and core routers 116, 118, and 120. In general, core routers 116, 118, and 120 may be high throughput routers designed to handle the internal traffic of the network. Edge routers 110, 112, and 114 may be routers designed to handle traffic between external users 130 and the core routers 116, 118, and 120. External users 130-134 may generally include, for example, an end user, a local area network (LAN), a proprietary network, etc.

Routers 110-120 may generally be conceptualized as network elements that may each have a number of capabilities. Network 100 may include network elements other than routers 110-120. The number and organization of the network elements shown in FIG. 1 are exemplary only; real-world networks may have many more, fewer, or different network elements.

Network 100 may be maintained by one or more service providers 150. Service provider 150 may need to reconfigure network 100, such as to provision network 100 for a new service or customer.

Consistent with an aspect of the invention, a database, called an Internet Services Database (ISD) 160 herein, may be associated with network 100. ISD 160 assists service provider 150 in provisioning network 100. ISD 160 generally keeps track of the services available from the network elements in network 100 and the services that have been provisioned for network 100.

Internet Services Database

Figure 2:
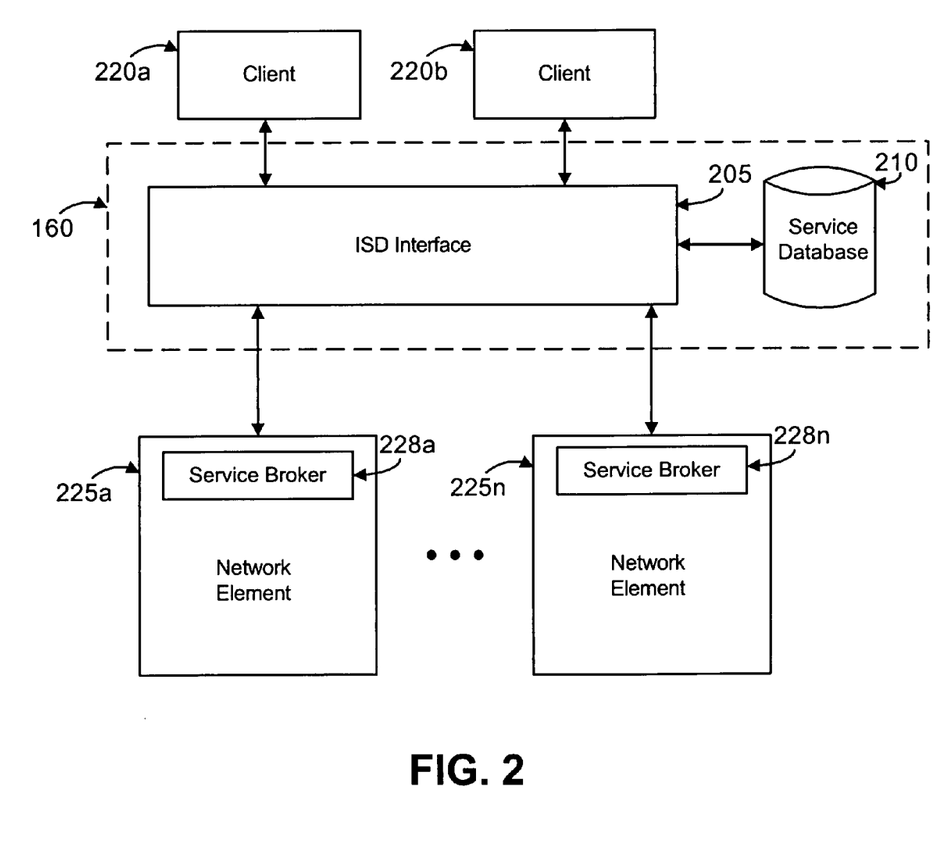
FIG. 2 is a block diagram conceptually illustrating the Internet Services Database shown in FIG. 1.

FIG. 2 is a block diagram conceptually illustrating ISD 160 and its relationship with other elements in network 100. ISD 160 may include an interface 205 and a service database 210. Service database 210 maintains stateful information and other information about the network services supported by the underlying network 100. In other words, database 210 stores the information regarding services supported by the network elements (e.g., routers 110-120) of network 100. This information can include, for example, for a particular network element, whether the network element supports MPLS and what version of the IP protocol the network element supports.

ISD interface 205 may connect to client applications 220a and 220b (collectively, "client applications 220") and to network elements 225a and 225n (collectively, "network elements 225"). Client applications 220 may include, for example, applications implemented by service provider 150. Client applications 220 may generally allow the service providers to request the provisioning of services in network 100, view the status of services, or monitor network elements in network 100. Network elements 225 may generally represent any device in network 100, such as routers 110-120. In one implementation, ISD 160 may itself be a network element that can remotely connect to client applications 220 and other network elements 225.

ISD 160 may act as a single management interface between client applications 220 and network elements 225. Client applications 220, when provisioning network 100, may simply transmit a request for the network service to ISD interface 205. For example, a client application may request that a VPN connection be formed between two addresses in network 100. ISD 160 may then decide how the request is to be handled, implement the request, and transmit an acknowledgement of the implemented request back to the client application. In this manner, client applications 220 are abstracted from the details of the communications with the network elements. This abstraction can allow services to be provisioned across mixed platforms from a single common policy and control layer, regardless of the underlying platform or equipment type.

As previously mentioned, service database 210 maintains information about the network services supported by the underlying network 100. Service database 210 may be, for example, a relational database or another type of database, and may use any of a number of architectures, such as Extensible Markup Language (XML), Common Information Model (CIM), Lightweight Directory Access Protocol (LDAP), or Common Open Policy Service Protocol (COPS), to model the services offered by the various network elements. The modeling architecture may be extensible so that it can support new services provided by the network elements.

Network elements 225 may include service broker modules 228a-228n (collectively, "service broker modules 228"), which may be software modules that represent the network element to ISD 160. More particularly, each of service broker modules 228 may act as a software interface for network service provisioning. Service broker modules 228 may, for example, run as a daemon communicating with an operating system of the network element in order to receive information pertaining to the network element and control services of the network element.

Figure 3:
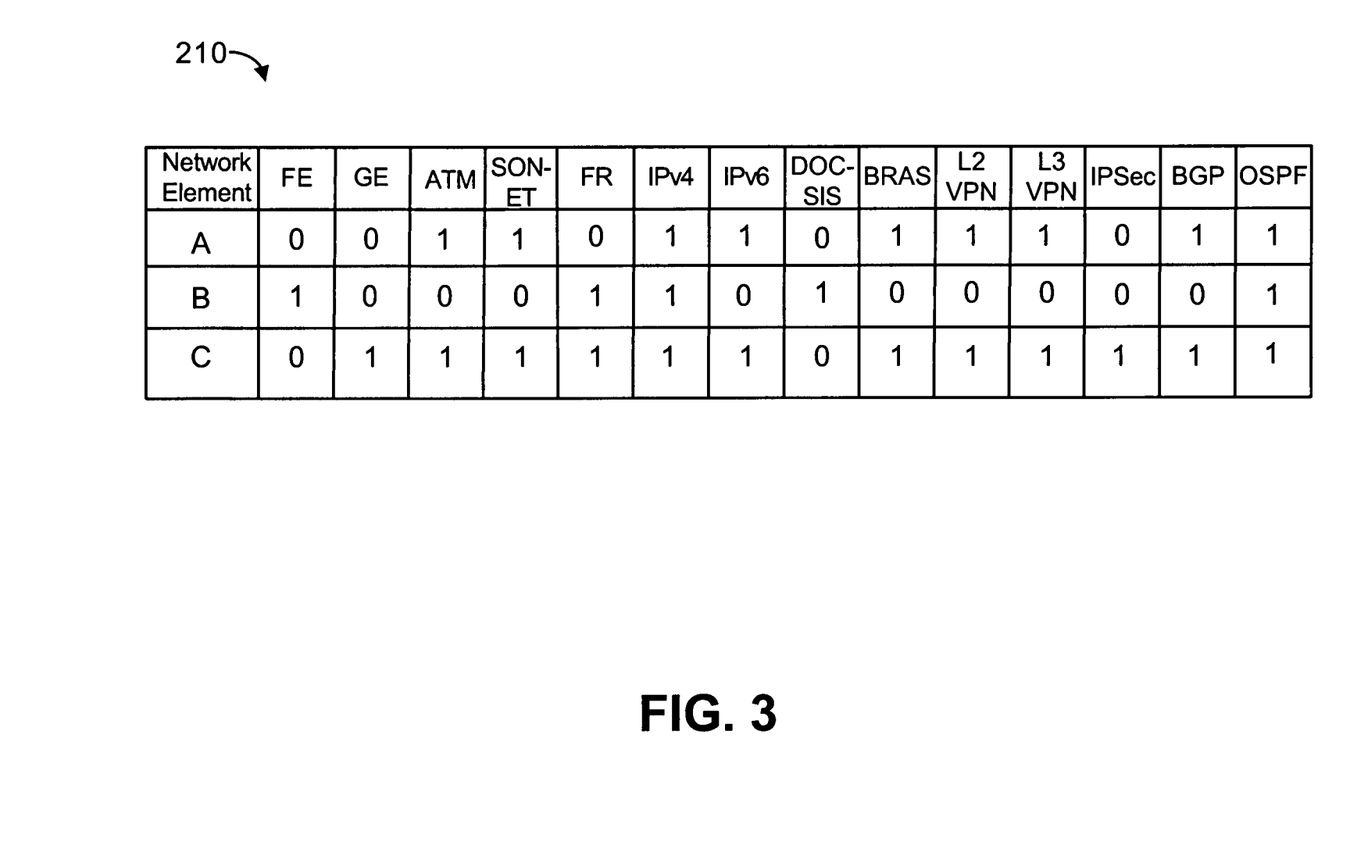
FIG. 3 is a diagram illustrating an exemplary portion of the service database shown in FIG. 2.

FIG. 3 is a diagram illustrating an exemplary portion of service database 210. In this example, assume that a "1" in service database 210 indicates that a service can be supported by the corresponding network element and a "0" indicates the service is not supported by the network element. Three network elements, labeled as "A," "B," and "C" are shown in FIG. 3. For each network element, database 210 may indicate which of a number of possible network services are supported. As shown, the possible services include Fast Ethernet (FE), Gigabit Ethernet (GE), support for Asynchronous Transfer Mode (ATM) transmission, support for Synchronous Optical Network (SONET) transmission, Frame Relay (FR), Internet Protocol version 4 (IPv4), Internet Protocol version 6 (Ipv6), support for the Data Over Cable Service Interface Specification (DOCSIS), Broadband Remote Access Server (BRAS), Layer 2 Virtual Private Network (L2 VPN), Layer 3 Virtual Private Network (L3 VPN), IP Security Protocol (IPSec), Border Gateway Control (BGP) support, and Open Shortest Path First (OSPF) support. This list of services is exemplary. Service database 210 may keep track of additional or fewer services.

Via service database 210, ISD 160 can determine whether a service requested by one of clients 220 can be implemented in network 100. For example, if a client requests that an L2 VPN connection be provisioned between two end points, ISD 160 may consult service database 210 to determine that the network elements "A" and "C" support this type of VPN connection. ISD 160 may then send requests to these two network elements to provision the L2 VPN connection. In this manner, in response to a client request, ISD 160 may select the most appropriate network elements to fulfill the request.

Service Broker Module

Figure 4:
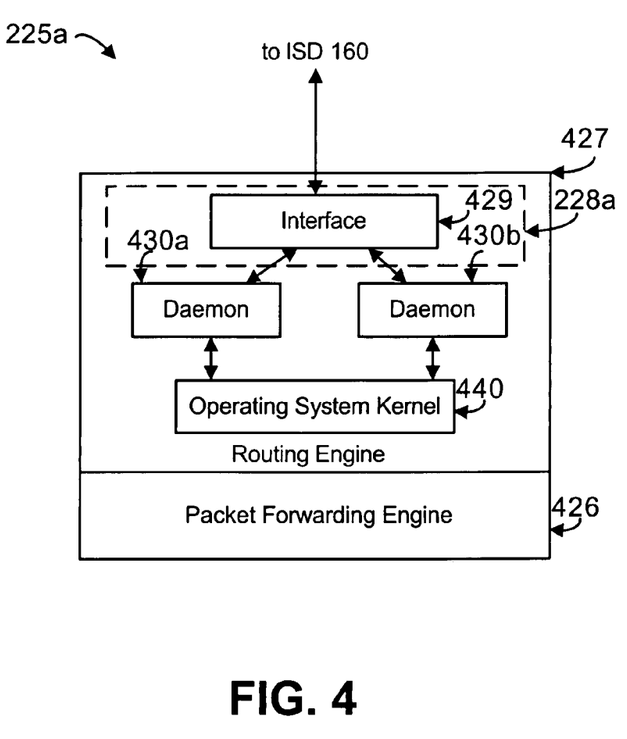
FIG. 4 is a diagram illustrating a possible implementation of a service broker module shown in FIG. 2.

FIG. 4 is a diagram illustrating, in additional detail, one embodiment of one of service broker modules 228 in a network element 225a. In this example, network element 225a is shown as a router that includes a packet forwarding engine 426 and a routing engine 427. Routing engine 427 may maintain one or more routing tables and a forwarding table. Through the routing tables, routing engine 427 consolidates routing information that routing engine 427 learns from the routing protocols of the network. From this routing information, the routing protocol process may determine the active routes to network destinations and install these routes into the forwarding table.

Packet forwarding engine 426 may receive incoming packets, look up an appropriate next hop for the packets from the tables maintained by routing engine 427, and transmit the packets to the appropriate output port or ports. In one implementation, routing engine 427 may be implemented using one or more general purpose processors that execute software designed to implement the routing protocols. The processor(s) that implement routing engine 427 may also implement service broker module 228a.

Service broker module 228a may include an interface component 429 that communicates with ISD 160. Additionally, service broker module 228a may include, or communicate with, daemon processes 430a and 430b (collectively, "daemon processes 430") that are responsible for monitoring the state or changing the state of network element 225a. In the exemplary implementation shown, daemon processes 430 communicate with operating system kernel 440 of routing engine 427.

Figure 5:
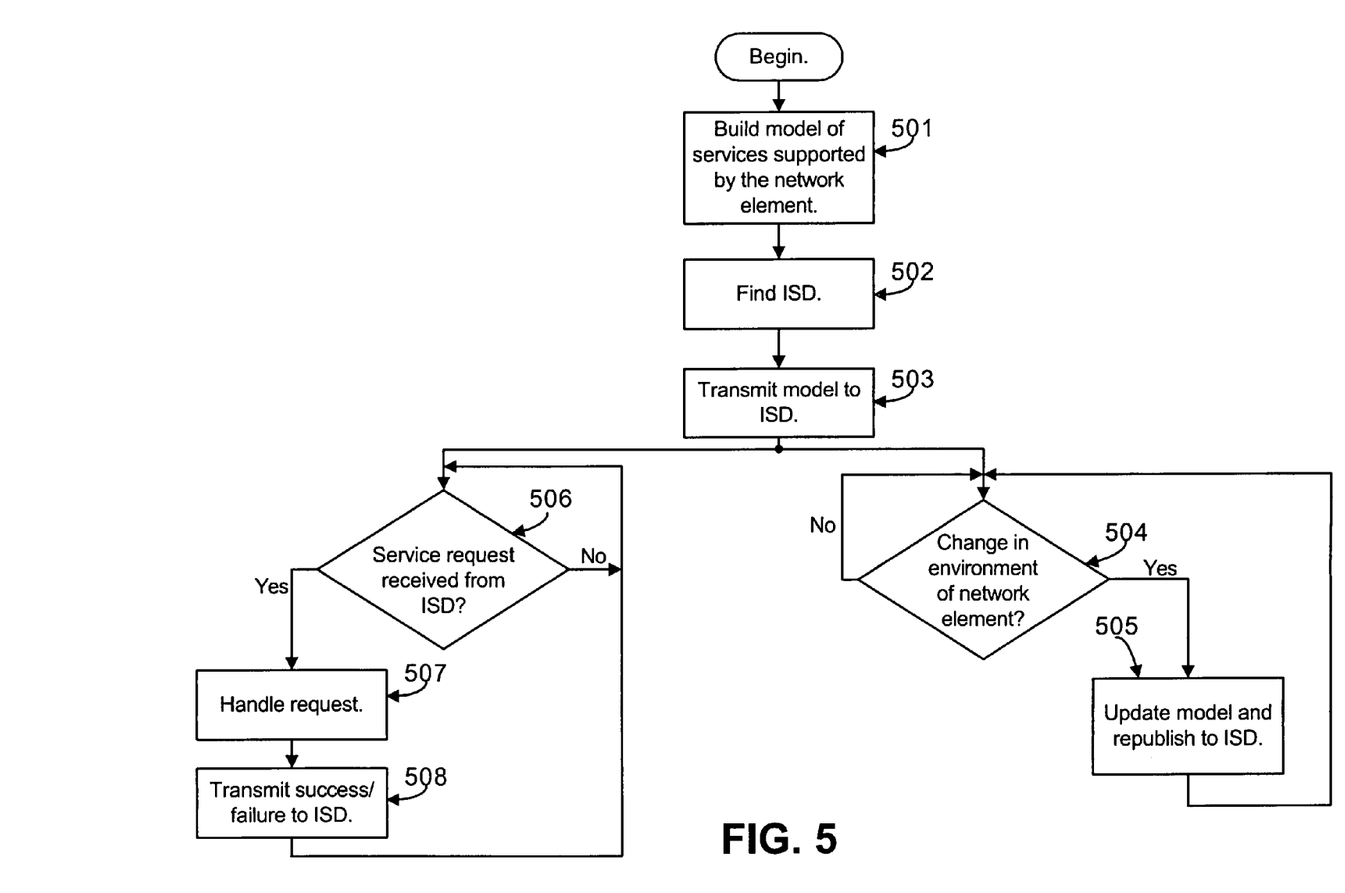
FIG. 5 is a flow chart illustrating operations consistent with aspects of the invention for operation of a service broker module.

FIG. 5 is a flow chart illustrating operations consistent with aspects of the invention for operation of service broker module 228a. Service broker module 228a may be initiated as part of the boot-up process of network element 225a or may be later initiated. In any event, after service broker module 228a boots-up, it may build a model of the services supported by its host network element (act 501). The model may include representations of the services supported by the network elements. Service broker module 228a also locates ISD 160 (act 502). Act 502 may be performed automatically by, for example, having service broker module 228a contact a pre-selected network address that corresponds to ISD 160 or use a directory service that gives service broker module 228a the address of ISD 160. Service broker module 228a may then transmit the model of its network element to ISD 160 (act 503).

During continued operation of network element 225a, service broker module 228a may monitor the state of the services of its network element 225a (act 504). When the state changes, service broker module 228a may update its corresponding model of network element 225a and transmit the updated information to ISD 160 (act 505). In some implementations, even if no changes in network element 225a occur, service broker module 228a may periodically transmit a "keep alive" message to ISD 160 that informs ISD 160 that service broker module 228a is still functioning. In this manner, service broker module 228a keeps ISD 160 apprised of the state of its network element, including faults or malfunctions that occur at the network element.

Additionally, during operation of network element 225a, service broker module 128 may receive service requests from ISD 160 (act 506). In response, service broker module 228a may control its network element 225a to implement the request (act 507). Service broker module 228a may be responsible for allocating resources of network element 225a to handle the request. For example, for a VPN request, service broker module 228a may instruct network element 225a to initiate a VPN session with a target address specified in the VPN request. In some situations, network element 225a may not be able to implement the service request. Service broker module 228a may acknowledge whether the service request was successfully implemented by sending an acknowledge message back to ISD 160 (act 508).

Service broker module 228a, as described above, proactively publishes a model of offered services as well as changes to the model. The model may be an abstraction of the underlying capabilities offered by network element 225a. By "pushing" an abstracted services model to a database, operation details unique to individual network elements, such as, for example, different manufacturers or models, can be hidden from service provider 150.

Clients

Returning to FIG. 2, clients 220 may be remote software applications that interact with ISD 160. The interaction may be implemented through an open application programming interface (API) at ISD 160. In this manner, the client applications could be customized for each service provider (or other user).

Clients 220 may generally perform a number of network management/provisioning functions by interacting with ISD 160. For example, clients 220 may query ISD 160 for the state of a network element or the services offered by a particular network element or group of network elements. ISD 160 may continually inform clients 220 of any changes in the network elements in which client 220 has an interest. Clients 220 may also issue network topographical, maintenance, or service provisioning requests through ISD 160. When making these requests, no network discovery or device interrogation is necessary by client 220. When ISD 160 receives a service request from one of clients 220, it may examine database 210 and, based on this examination, select the most appropriate service broker modules 228 to fulfill the request. When the request is accomplished by the selected service broker module, ISD 160 may update database 210 and acknowledge completion (or failure) of the request to client 220. ISD 160 may retry the request with alternate service broker modules 228 when the initially selected service broker module is unable to handle the request.

Conclusion

Techniques are described above that allow service providers to view their networks as a collection of services and service enablers, rather than as network elements such as routers, interfaces and protocols. In particular, a database is used to maintain a current state of the services offered by the network. The network elements may include a module that proactively pushes state information relating to the network element to the database.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been presented with respect to FIG. 5, the order of the acts may be different in other implementations consistent with principles of the invention. Also, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A network device that routes traffic in a network, the network device comprising:
   a service broker, at least partially implemented in hardware, to:
      construct a model of network protocols and network standards supported by the network device;
      automatically locate, based on constructing the model and at a first time, a network database, the network database being included in a device, separate from the network device, that interfaces between a client application of a service provider and a plurality of network devices, including the network device, the service broker, when locating the network database, being to:
contact a pre-selected network address associated with the network database;

proactively transmit, based on locating the network database and at a second time, the model to the network database independent of a request for the model,
the network database maintaining service information relating to the plurality of network devices in the network, and
the second time occurring after the first time;

utilize one or more daemon processes to monitor, during a third time and based on proactively transmitting the model to the network database, a state of services of the network device,
the third time occurring after the second time,
the one or more daemon processes monitoring the state of services of the network device and communicating the state of services of the network device to the service broker;

update, based on monitoring the state of services, the model to create an updated model,
the updated model being different than the model;

proactively transmit the updated model to the network database independent of a request for the updated model;

receive, based on transmitting at least one of the model or the updated model, a service request from the client application of the service provider via the network database,
the service request including a request for a particular network protocol or a particular network standard supported by the network device;

cause the network device to implement the service request by allocating resources of the network device to handle the service request; and transmit, based on implementing the service request by the network device, an acknowledgement message to the network database; and an interface to the network.

2. The network device of claim 1, where the updated model includes a plurality of changes to the model.

3. The network device of claim 1, where the service broker is further to:
transmit a keep alive message to the network database when the state of services of the network device does not change.

4. The network device of claim 1, where the network device further includes:
a packet forwarding engine, and
a routing engine to implement the service broker.

5. The network device of claim 1, where the model relates to at least one of:
Ethernet services,
Asynchronous Transfer Mode transmission services,
Synchronous Optical Network transmission services,
an Internet Protocol version service, or
Virtual Private Networks services.

6. The network device of claim 1, where the acknowledgment message includes information indicating that the service request was successfully implemented by the network device.

7. The network device of claim 1, where the model is an abstraction of underlying capabilities offered by the network device.

8. A method, comprising:
constructing, by a network device, a model of network protocols and network standards supported by the network device;

automatically locating, by the network device and based on constructing the model and at a first time, a network database,
the network database maintaining service information relating to a plurality of network devices, including the network device, in a network,
the network database being included in a device, separate from the network device, that interfaces between a client application of a service provider and the plurality of network devices, and
locating the network database including:
contacting a pre-selected network address associated with the network database;

proactively transmitting, by the network device and based on locating the network database and at a second time, the model to the network database,
the model being transmitted without receiving a network discovery request or a device interrogation request from the network database, and
the second time occurring after the first time;

utilizing one or more daemon processes to monitor, by the network device and based on proactively transmitting the model to the network database and during a third time, a state of services of the network device,
the third time occurring after the second time,
the one or more daemon processes monitoring the state of services of the network device and communicating the state of services of the network device to the network device;

updating, by the network device and based on monitoring the state of services, the model to create an updated model,
the updated model being different than the model;

proactively transmitting, by the network device, the updated model to the network database without receiving a request for the updated model;

receiving, by the network device and based on transmitting at least one of the model or the updated model, a service request from the client application of the service provider via the network database,
the service request including a request for a network protocol or a network standard supported by the network device;

allocating, by the network device, resources of the network device to handle the service request; and transmitting, by the network device and based on allocating the resources of the network device, an acknowledgement message to the network database.

9. The method of claim 8, where the updated model includes a plurality of changes to the model.

10. The method of claim 8, further comprising:
transmitting a keep alive message to the network database when the state of services of the network device does not change.

11. The method of claim 8, where the network device includes:
a packet forwarding engine, and
a routing engine.

12. The method of claim 8, where the model relates to at least one of:
Ethernet services,
Asynchronous Transfer Mode transmission services,
Synchronous Optical Network transmission services,
an Internet Protocol version service, or
Virtual Private Networks services.

13. The method of claim 8, where the acknowledgment message includes information indicating that the service request was successfully implemented by the network device.

14. The method of claim 8, where the model is an abstraction of underlying capabilities offered by the network device.

15. A device that routes traffic in a network, the device comprising:
one or more processors, implemented at least partially in hardware, to:
construct a model of network protocols and network standards supported by the device;
automatically locate, based on constructing the model and at a first time, a network database,
the network database being included in another device, separate from the device, that interfaces between a client application of a service provider and a plurality of devices, including the device,
the one or more processors, when locating the network database, being to:
contact a pre-selected network address associated with the network database;
proactively transmit, based on locating the network database and at a second time, the model to the network database without receiving a request for the model from the network database,
the network database maintaining service information relating to the plurality of devices in a network, and
the second time occurring after the first time;
utilize one or more daemon processes to monitor, during a third time and based on proactively transmitting the model to the network database, a state of services of the device,
the third time occurring after the second time,
the one or more daemon processes monitoring the state of services of the device and communicating the state of services of the device to the device;
update, based on monitoring the state of services, the model to create an updated model,
the updated model being different than the model;
proactively transmit the updated model to the network database without a request for the updated model from the network database;
receive, based on transmitting at least one of the model or the updated model, a service request from the client application of the service provider via the network database,
the service request including a request for a particular network protocol or a particular network standard supported by the device;
control the device to implement the service request by allocating resources of the device to handle the service request; and
transmit, based on implementing the service request by the device, an acknowledgement message to the network database.

16. The device of claim 15, where the updated model includes a plurality of changes to the model.

17. The device of claim 15, where the one or more processors are further to:
transmit a keep alive message to the network database when the state of services of the device does not change.

18. The device of claim 15, where the device includes:
a packet forwarding engine, and
a routing engine.

19. The device of claim 15, where the network is maintained by the service provider, and
where the one or more processors, when proactively transmitting the model, are to:
hide at least one operation detail unique to the device from the service provider.

20. The device of claim 19, where the at least one operation detail identifies at least one of a manufacturer of the device or a model of the device.

21. The device of claim 15, where the one or more processors, when proactively transmitting the model, are to:
push the model to the network database.

* * * * *